(12) United States Patent  
Ku et al.

(10) Patent No.: US 9,225,234 B2  
(45) Date of Patent: Dec. 29, 2015

(54) IN-RUSH CURRENT CONTROL FOR CHARGE-PUMP LDO

(71) Applicant: BROADCOM CORPORATION, Irvine, CA (US)

(72) Inventors: I-Ning Ku, Los Angeles, CA (US); Hui Zheng, Irvine, CA (US); Xicheng Jiang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 405 days.

(21) Appl. No.: 13/843,202

(22) Filed: Mar. 15, 2013

(65) Prior Publication Data

US 2014/0266099 A1   Sep. 18, 2014

(51) Int. Cl.
*G05F 1/575* (2006.01)
*H02M 1/36* (2007.01)
*G05F 1/56* (2006.01)
*H02M 3/07* (2006.01)

(52) U.S. Cl.
CPC . *H02M 1/36* (2013.01); *G05F 1/56* (2013.01); *H02M 3/07* (2013.01)

(58) Field of Classification Search
CPC ............. G05F 3/24; G05F 1/575; G05F 3/30
USPC .................. 323/265, 273, 280, 287, 312, 313
See application file for complete search history.

(56) References Cited

U.S. PATENT DOCUMENTS

| | | | |
|---|---|---|---|
| 8,248,150 B2 | 8/2012 | Tadeparthy et al. | |
| 8,841,891 B2* | 9/2014 | Williams | 323/265 |
| 8,928,367 B2* | 1/2015 | Wang et al. | 327/112 |
| 2011/0089916 A1* | 4/2011 | Soenen et al. | 323/280 |
| 2012/0187935 A1* | 7/2012 | Simons | 323/313 |
| 2013/0113415 A1* | 5/2013 | Chen et al. | 320/107 |

OTHER PUBLICATIONS

Sanchez-Sinencio, "Low Drop-Out (LDO) Linear Regulators: Design Considerations and Trends for High Power-Supply Rejection (PSR)," IEEE Santa Clara Valley Solid State Circuits Society, Feb. 11, 2010, 47 pages.
Davis, "Low-Dropout (LDO) Linear Regulators," <http://electronicdesign.com/power/low-dropout-ldo-linear-regulators>, Jun. 28, 2007, 3 pages.

* cited by examiner

*Primary Examiner* — Adolf Berhane
(74) *Attorney, Agent, or Firm* — McDermott Will & Emery LLP (57) ABSTRACT

A circuit for a charge-pump low-dropout (LDO) regulator may include a comparator circuit configured to control a pass transistor based on an error signal. A pre-charge path may be provided between a supply voltage and an output node of the regulator. The pre-charge path may be configured to allow charging of an output capacitor to a pre-charge voltage during a pre-charge operation mode. The output capacitor may be coupled between the output node of the regulator and ground potential. The pass transistor may be configured to allow charging of the output capacitor during an LDO mode of operation. A charge-pump circuit may be configured to provide a current for charging the output capacitor during the LDO mode of operation.

20 Claims, 5 Drawing Sheets

IN-RUSH CURRENT CONTROL FOR CHARGE-PUMP LDO

TECHNICAL FIELD

The present description relates generally to voltage regulators, and more particularly, but not exclusively, to in-rush current control for charge-pump low-dropout (LDO) regulators.

BACKGROUND

Charge pump regulators can form an important part of many communication devices, such as DSL modems, wireless portable devices, such as cellular telephones, tablets, phablets, laptops, and the like. For example, a mobile communications device without multiple supply rails may potentially use a charge pump regulator to provide multiple supply voltage levels by selectively charging and discharging one or more capacitors. However, conventional charge pump regulators are not easily adaptable for use in many mobile communication devices.

Typically, conventional charge pump regulators are unable to generate the multiple voltage reference levels that are required by components such as Class-G amplifiers within many mobile communication devices. A Class-G amplifier driving an audio headset of a cellular telephone, for instance, may require multiple sets of supply voltages, which a single conventional charge pump may be unable to provide. Moreover, conventional charge pump regulators using multiple fly-back capacitors or switching regulators may often be too inefficient or costly for many mobile communication devices. Many mobile communication devices may require a single charge pump regulator that can generate multiple sets of reference voltages, and can smoothly transition between these multiple reference voltages in a power-efficient and reliable manner.

A charge-pump low-dropout (LDO) regulator may maintain regulation with a small difference between the regulated output voltage and a reference voltage such as an input supply voltage. The low dropout voltage and low quiescent current of charge-pump LDO regulators may make the charge-pump LDO regulators a good fit for many portable and wireless applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1A:
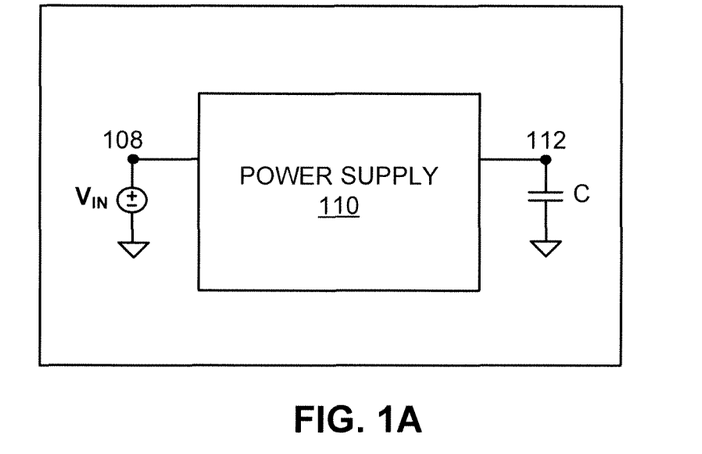
FIG. 1A illustrates an example power supply including a charge-pump low-dropout (LDO) regulator with in-rush current control in accordance with one or more implementations.

FIG. 1A illustrates an example power supply 110 including a charge-pump low-dropout (LDO) regulator with in-rush current control in accordance with one or more implementations of the subject technology. Power supplies are an integral part of almost all systems and devices and may be provided as a separate device or may appear on the same printed circuit board (PCB) or on the same chip with other circuitries. For example, a power supply 110, may use, at an input port 108, an input supply voltage $V_{IN}$ (e.g., one or more batteries), the voltage of which may vary with load or over the time. The power supply 110 may use a regulator to provide a substantially constant voltage at an output port 112 to a capacitive load C. The power supply 110 may include a charge-pump regulator such as a charge-pump LDO regulator.

Charge-pump LDO regulators are typically used in systems that may require a low-noise power source, instead of switching regulators that might upset the system Existing charge-pump LDO regulators may suffer from a large in-rush current during the LDO mode of operation (hereinafter "LDO mode"). The solution provided by the subject technology reduces the in-rush current drastically and is significantly more reliable and less costly than the existing solutions. This is because the use of larger switches and wider metallization, which are needed in many conventional charge-pump LDO regulators, is significantly reduced by the subject technology. Another existing solution that can limit the in-rush current by reference ramping is less cost effective due to the use of a ramping circuit, the implementation of which can add to the cost.

Figure 1B:
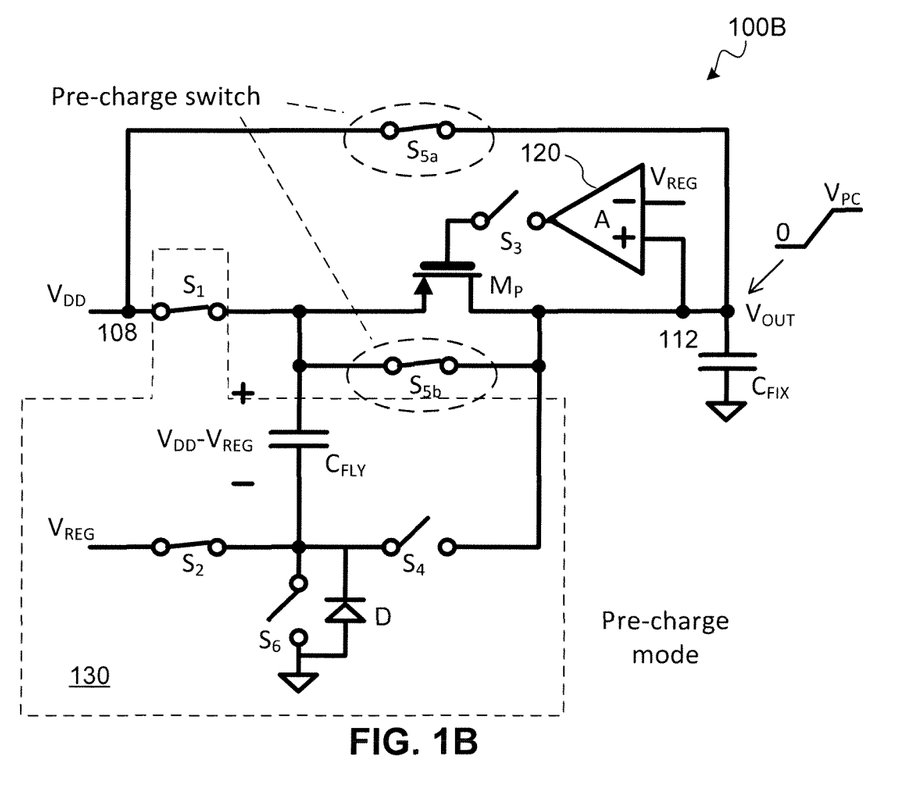
FIG. 1B illustrates an example charge-pump LDO regulator with in-rush current control in a pre-charge mode of operation in accordance with one or more implementations.

FIG. 1B illustrates an example charge-pump LDO regulator 100B with in-rush current control, in a pre-charge mode of operation, in accordance with one or more implementations of the subject technology. The charge-pump LDO regulator 100B may include a comparator 120, a pass transistor Mp, a charge-pump circuit 130, a switch $S_3$ (e.g., a feedback switch), and a pre-charge switch $S_{5a}$ or $S_{5b}$. Only one of the pre-charge switches $S_{5a}$ and $S_{5b}$ may be implemented and used. In other words, the charge-pump LDO regulator 100B may be implemented with the pre-charge switch $S_{5a}$, or in another embodiment, with the pre-charge switch $S_{5b}$.

The comparator 120, also referred to as error amplifier, may be an amplifier such as an operational amplifier. The comparator 120 may include plus and minus input nodes and an output node. The minus input node of the comparator 120 may be coupled to a reference voltage (e.g., $V_{REG}$) that can be provided by a bandgap circuit. The positive input node of the comparator 120 may be coupled to voltage $V_{out}$ of the output port 112 of the regulator. The pass transistor Mp may be an MOS transistor (e.g., NMOS or PMOS) or a BJT. Use of a PMOS (versus NMOS) transistor as the pass transistor Mp may be advantageous, for example, in applications with lower dropout voltage between the source and drain terminals of the pass transistor Mp. The source terminal of the pass transistor Mp may be coupled via a switch $S_1$ to the input port 108, and the drain terminal of the pass transistor Mp may be coupled to the output port 112.

A switch $S_3$ may be provided to couple the output node of the comparator 120 to the gate terminal of the pass transistor Mp. The switch $S_3$ may be closed only during the LDO mode, as described below. At the onset of the LDO mode, a large in-rush current (e.g., 3-4 A at the peak) may pass through the pass transistor Mp to the load capacitance $C_{FIX}$. Handling such a large current may require a large pass transistor Mp, a large switch $S_1$, and wider metallization. The charge-pump LDO regulator 100B may reduce the in-rush current drastically (e.g., to a few hundred mA), by allowing the capacitive load $C_{FIX}$ to pre-charge to a pre-charge level $V_{PC}$, during a pre-charge mode of operation (hereinafter "pre-charge mode").

During the Precharge mode, as shown in FIG. 1B, one of the pre-charge switches $S_{5a}$ or $S_{5b}$, which is implemented, may close to allow the capacitive load $C_{FIX}$ to charge through a current path, between the input port 108 and the output port 112. The current path may not include the pass transistor Mp. If the charge-pump LDO regulator 100B is realized with the pre-charge switch $S_{5a}$, during the Precharge mode, pre-charge switch $S_{5a}$ may be closed to provide the path for the pre-charge current to flow from the input port 108 coupled to the supply voltage $V_{DD}$ to the capacitive load $C_{FIX}$. Otherwise, if the charge-pump LDO regulator 100B is realized with the pre-charge switch $S_{5b}$, during the Precharge mode, pre-charge switch $S_{5b}$ and switch S1 may be closed to provide the path for the pre-charge current to the capacitive load $C_{FIX}$. The pre-charge current may be a small current that during the pre-charge mode of operation gradually charges the capacitive load $C_{FIX}$ to the pre-charge level $V_{PC}$.

The pre-charge level $V_{PC}$ may be any level below $V_{REG}$, for example, 80% of $V_{REG}$. higher values of pre-charge level $V_{PC}$ may allow smaller in-rush currents. The pre-charge switches $S_{5a}$ and $S_{5b}$ may be controlled by a control logic which can be driven by an output of a comparator that compares the output voltage $V_{out}$ with a preset value (e.g., a desired value) for the pre-charge level $V_{PC}$. The control logic may open the pre-charge switch $S_{5a}$ or $S_{5b}$ when the output voltage $V_{out}$ approximately equals the pre-charge level $V_{PC}$.

The charge-pump circuit 130 may include a switch-capacitor charge-pump including a number of switches and a fly-back capacitor $C_{FLY}$. For example, the charge-pump circuit 130 may include switched $S_2$, $S_4$, and $S_6$. Diode D may represent a diode associated with the switch $S_6$, which is shown separately for the ease of understanding the operation of the charge-pump circuit 130. Switches $S_1$, $S_2$, $S_3$, and $S_4$ may be controlled via clock pulses generated by a clock generator, which is not shown here for simplicity. The operation of the charge-pump circuit 130 is discussed below with respect to other modes of operation of the regulator.

Figure 1C:
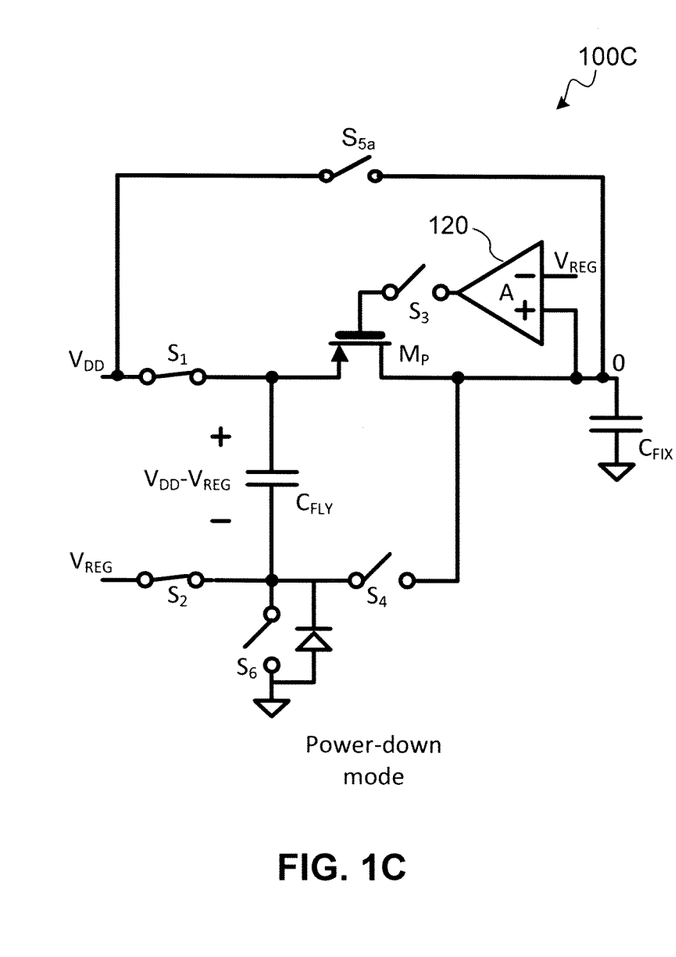
FIG. 1C illustrates an example charge-pump LDO regulator with in-rush current control in a power-down mode of operation in accordance with one or more implementations.

FIG. 1C illustrates an example charge-pump LDO regulator 100C with in-rush current control, in a power-down mode of operation, in accordance with one or more implementations of the subject technology. The charge-pump LDO regulator 100C is similar to the charge-pump LDO regulator 100B of FIG. 1B, except that the pre-charge switch $S_{5a}$ is open during the power-down mode of operation (hereinafter "power-down mode"). The pre-charge switch $S_{5b}$ of FIG. 1B is not implemented in the charge-pump LDO regulator 100C. During the power-down mode, switches $S_1$ and $S_2$ are closed, therefore, the fly-back capacitor $C_{FLY}$ may charge to the level of $V_{DD}$-$V_{REG}$. The pass transistor Mp is not conducting as its gate terminal is not connected to the output of the comparator 120 (switch $S_3$ is open), thus the capacitive load $C_{FIX}$ is not charging.

Figure 1D:
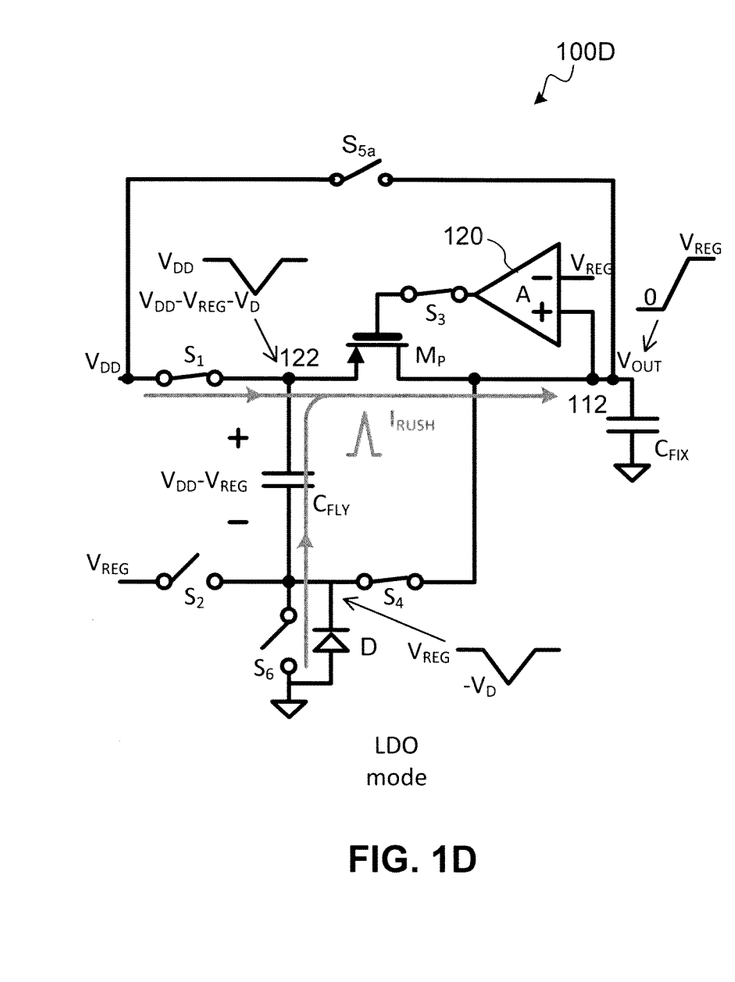
FIG. 1D illustrates an example charge-pump LDO regulator with in-rush current control in an LDO mode of operation in accordance with one or more implementations.

FIG. 1D illustrates an example charge-pump LDO regulator 100D with in-rush current control, in an LDO mode, in accordance with one or more implementations of the subject technology. The charge-pump LDO regulator 100D is similar to the charge-pump LDO regulator 100B of FIG. 1B, except that the pre-charge switch $S_{5a}$ is open and switches $S_3$ and $S_4$ are closed during the LDO mode. The pre-charge switch $S_{5b}$ of FIG. 1B is not implemented in the charge-pump LDO regulator 100D. During the LDO mode, the closed switch $S_3$ may allow the gate of the pass transistor to be coupled to the output node of the comparator 120. As long as the output voltage $V_{out}$ has not outreached the level of the reference voltage $V_{REG}$, the output node of the comparator 120 may be kept at a negative voltage. The negative voltage at the gate terminal of the pass transistor Mp may keep the pass transistor Mp in the triode region that can allow a charge current (e.g., an in-rush current) to pass to the capacitive load $C_{FIX}$.

Referring back to FIG. 1B, The in-rush current may be provided by both the supply voltage $V_{DD}$ and the fly-back capacitor $C_{FLY}$, which is charged to the $V_{DD}$-$V_{REG}$ level, during the power-down mode. The in-rush current at the onset of the LDO mode may charge the capacitive load $C_{FIX}$ from the pre-charge level $V_{PC}$ to the reference voltage $V_{REG}$, in a short time. As soon as the output voltage $V_{out}$ (e.g., of the capacitive load $C_{FIX}$) outreaches the level of the reference voltage $V_{REG}$, the output of the comparator 120 may turn positive and in turn send the pass transistor Mp into active region. Therefore, during the LDO mode, the output voltage $V_{out}$ may stay constant at the level of the reference voltage $V_{REG}$, without significant variation. The in-rush current may be significantly reduced due to the pre-charging of the capacitive load $C_{FIX}$ to the pre-charge level $V_{PC}$, which is close to the reference voltage $V_{REG}$. In other words, at the onset of the LDO mode, the voltage difference between node 122 (e.g., source terminal of the pass transistor Mp) and the output port 112 is significantly reduced due to the pre-charging of the capacitive load $C_{FIX}$, during the pre-charge mode. The voltage at the input port 122 is shown to change from $V_{DD}$ to $V_{DD}$-$V_{REG}$-$V_D$, as the status of the switch $S_2$ is changed from closed (e.g., in the power-down mode) to open, where $V_D$ is the voltage drop across the diode D associated with the switch $S_6$.

The reduced in-rush current is an advantageous feature of the subject technology, that allows using a small pre-charge switch (e.g., $S_{5a}$ or $S_{5b}$ of FIG. 1B) to pre-charge the capacitive load $C_{FIX}$, and avoid using a large switch $S_1$ and pass transistor Mp and wide metallization. This may result in a more reliable charge-pump LDO regulator that can be realized at a significantly reduced cost.

Figure 2:
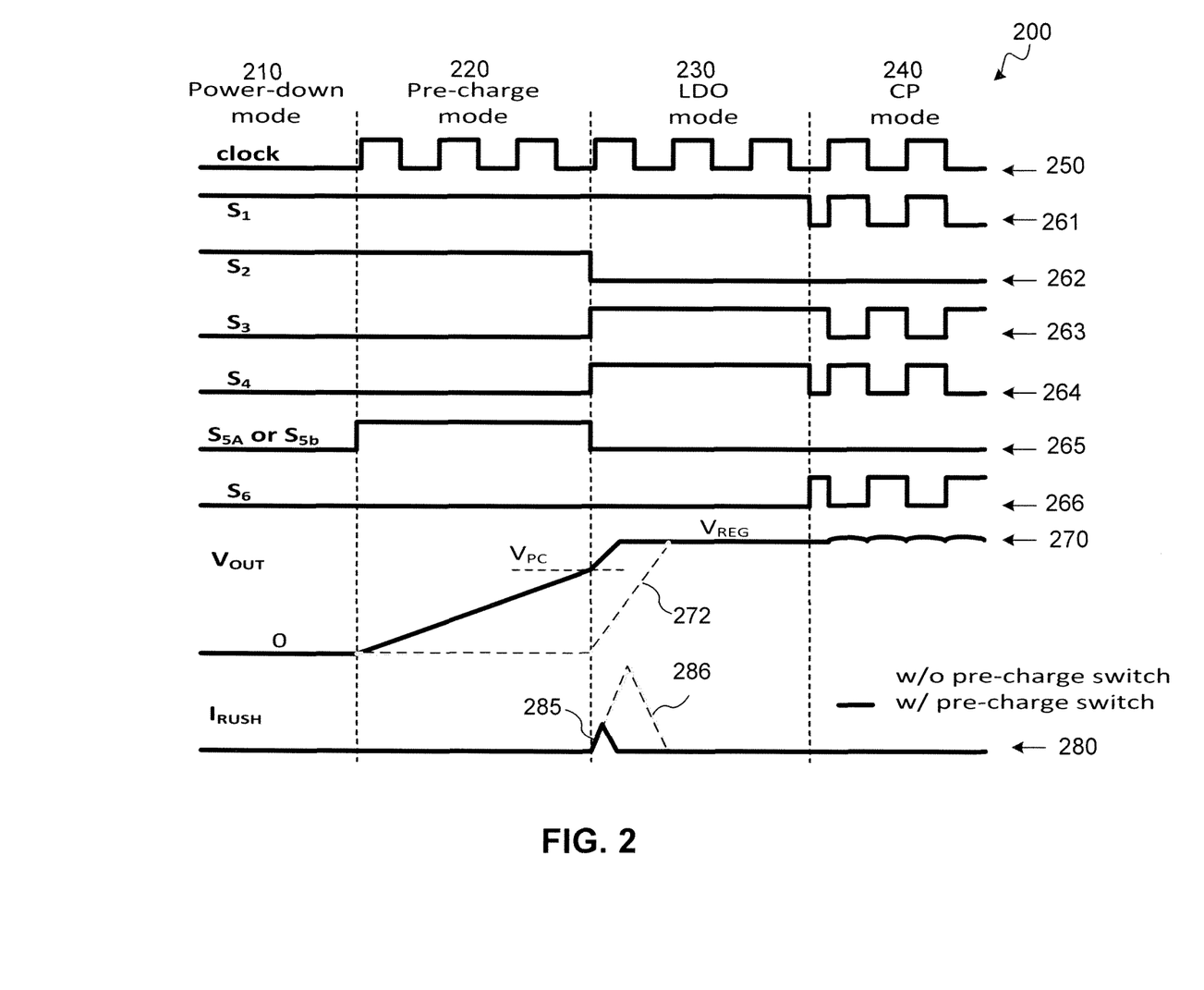
FIG. 2 illustrates an example timing diagram for a charge-pump LDO regulator with in-rush current control in accordance with one or more implementations.

FIG. 2 illustrates an example timing diagram 200 for a charge-pump LDO regulator with in-rush current control in accordance with one or more implementations of the subject technology. The timing diagram 200 show the statuses 261-266 of switches $S_1$-$S_4$, $S_{5a}$ or $S_{5b}$, and $S_6$, respectively, during the power-down mode 210, pre-charge mode 220, LDO mode 230, and charge pump (CP) mode 240. Also, in the timing diagram 200 clock signals 250, the output voltage signal 270 (e.g., $V_{OUT}$), and the in-rush current signal 280 (e.g., $I_{rush}$) are shown. During the power-down mode 210, switches $S_1$ and $S_2$ are closed to allow charging of the fly-back capacitor $C_{FLY}$, whereas the other switches are open, and the output voltage $V_{OUT}$ and the in-rush current $I_{rush}$ are zero.

The pre-charge mode 220 may start, for example, at the first rising edge of the clock signal 250 and may last for three clock cycles and terminate at the fourth rising edge of the clock signal 250, when the output voltage $V_{OUT}$ has reached the preset value of the pre-charge voltage $V_{PC}$. During the pre-charge mode 220, Switches $S_1$, $S_2$, and the implemented pre-charge switch $S_{5a}$ or $S_{5b}$ are closed and the rest of the switches are open. During the pre-charge mode 220, as described above, the precharge switch (e.g., $S_{5a}$ or $S_{5b}$) may provide a charging path so that the capacitive load $C_{FIX}$ of FIG. 1B can gradually charge up until the output voltage $V_{OUT}$ reaches the desired pre-charge voltage $V_{PC}$.

The LDO mode may start at the fourth rising edge of the clock signal 250 and may last for a desired time, after which the regulator may switch to the CP mode 240. During the LDO mode, switches $S_1$, $S_3$ and $S_4$ are closed and the rest of switches are open. At the onset of the LDO mode, the current $I_{RUSH}$ charges the capacitive load $C_{FIX}$ to the level of the reference voltage $V_{REG}$. From that point on, the output voltage $V_{OUT}$ remains substantially constant during the LDO mode. The $V_{OUT}$ variation 272 corresponds to the LDO mode without pre-charging, which shows a faster rise of the voltage $V_{OUT}$ from 0V to the reference voltage $V_{REG}$. To illustrate one of the benefits of the pre-charging mode disclosed herein, in-rush currents 285 and 286, respectively, corresponding to the LDO regulators with and without the pre-charge mode is shown. The significantly reduced in-rush current 285 with the pre-charge mode is an advantageous feature of the subject technology.

When desired, the charge-pump LDO regulator of the subject technology may start operating in a CP mode 240, where as shown in the timing diagram 200, the switch $S_2$ and the precharge switch (e.g., $S_{5a}$ or $S_{5b}$) may be open and the rest of switches may toggle synchronized with the clock signal. Switches $S_1$ and $S_4$ may close when the switches $S_3$ and $S_6$ are open and vise versa. During the CP mode 240, the output voltage $V_{OUT}$ may have more ripples as compared to the LDO mode.

Figure 3:
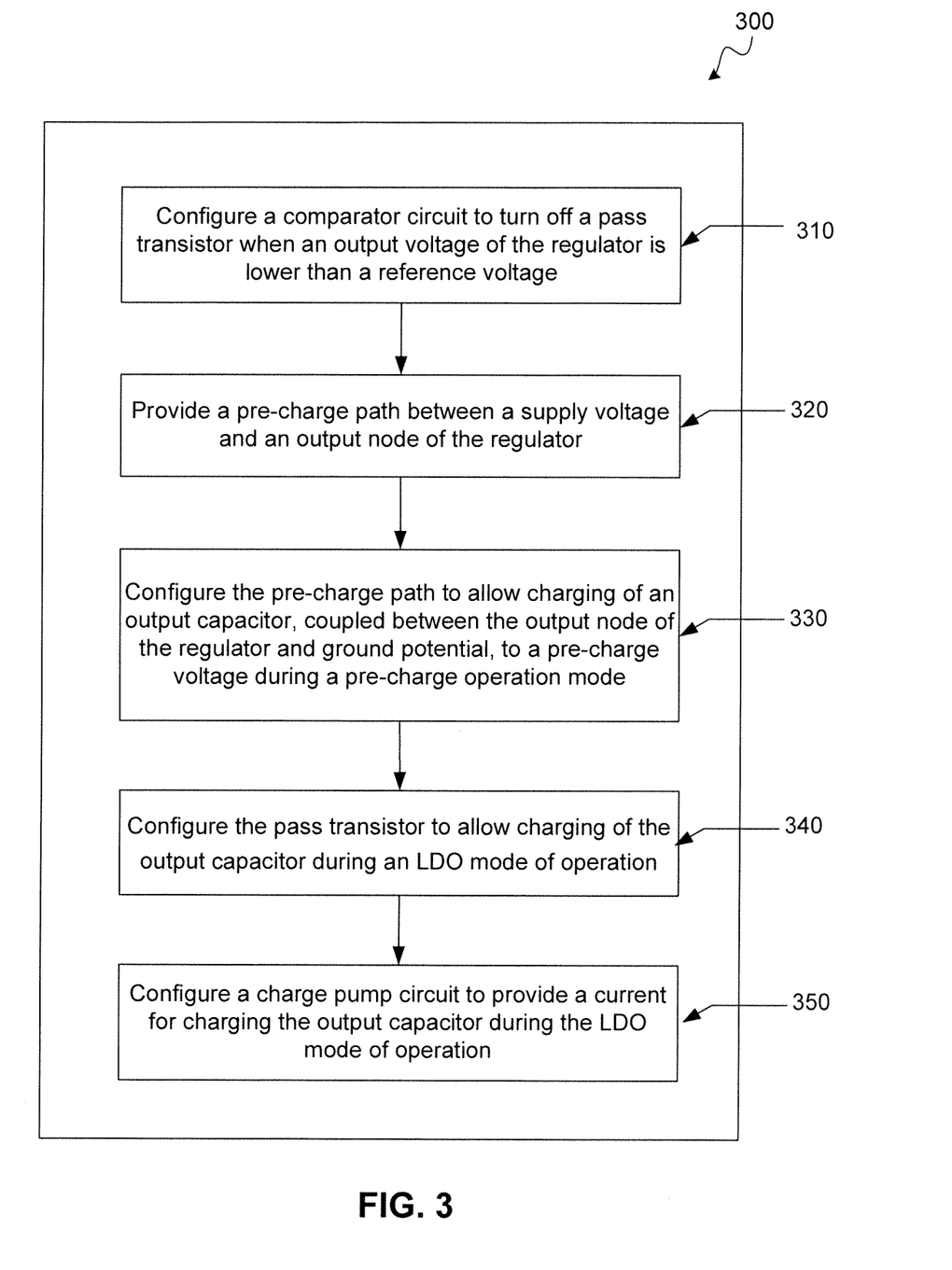
FIG. 3 illustrates an example method for providing a charge-pump LDO regulator with in-rush current control in accordance with one or more implementations.

FIG. 3 illustrates an example method for providing a charge-pump LDO regulator with in-rush current control in accordance with one or more implementations of the subject technology. For explanatory purposes, the example method 300 is described herein with reference to the charge-pump LDO regulators 100B and 100D of FIGS. 1B and 1D and the timing diagram 200 of FIG. 2; however, the example method 300 is not limited to the charge-pump LDO regulators 100B and 100D and the timing diagram 200. Further for explanatory purposes, the blocks of the example method 300 are described herein as occurring in serial, or linearly. However, multiple blocks of the example method 300 may occur in parallel. In addition, the blocks of the example method 300 need not be performed in the order shown and/or one or more of the blocks of the example method 300 need not be performed.

At operation block 310, a comparator circuit (e.g., 120 of FIG. 1B) and switch $S_3$ may be configured to control a pass transistor (e.g., Mp of FIG. 1B) based on an error signal defined as a difference between an output voltage of the regulator (e.g., Vout of FIG. 1B) and a reference voltage (e.g., $V_{REG}$ of FIG. 1B). A pre-charge path (e.g., via one of pre-charge switches $S_{5a}$ or $S_{5b}$) may be provided, at operation block 320, between a supply voltage (e.g., $V_{DD}$ of FIG. 1B) and an output node (e.g., 112 of FIG. 1B) of the regulator.

At operation block 330, the pre-charge path may be configured to allow charging of an output capacitor (e.g., $C_{FIX}$ of FIG. 1B) to a pre-charge voltage (e.g., $V_{PC}$ of FIG. 1B) during a pre-charge operation mode. The output capacitor may be coupled between the output node of the regulator and ground potential. At operation block 340, the pass transistor may be configured to allow charging of the output capacitor during an LDO mode of operation (e.g., FIG. 1D and 230 of FIG. 2). A charge-pump circuit (e.g., 130 of FIG. 1B) may be configured, at operation block 350, to provide a current (e.g., $I_{rush}$ of FIG. 1D) for charging the output capacitor during the LDO mode of operation.

Figure 4:
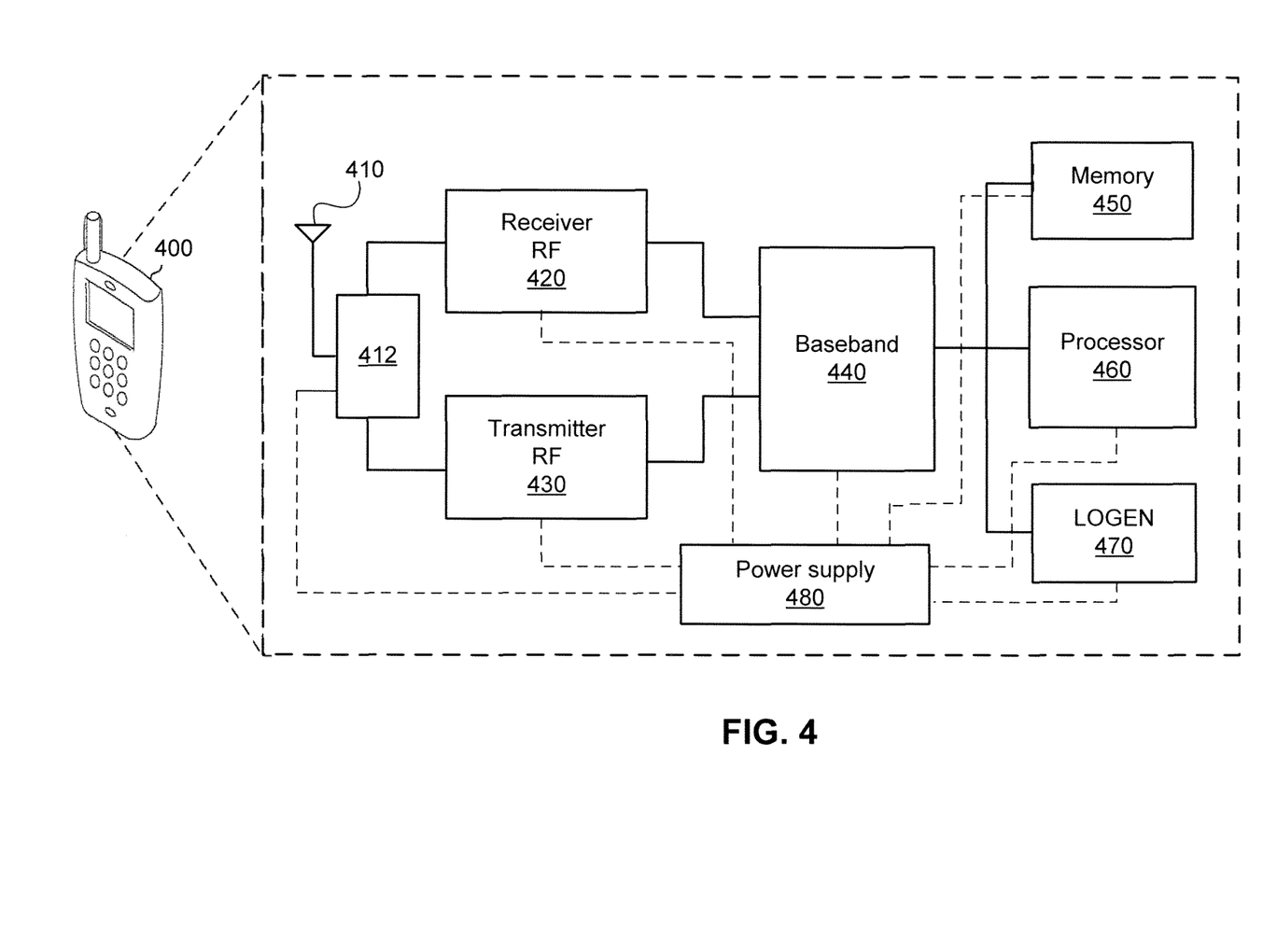
FIG. 4 illustrates an example wireless communication device in accordance with one or more implementations.

FIG. 4 illustrates an example wireless communication device 400 in accordance with one or more implementations of the subject technology. The wireless communication device 400 may comprise a radio-frequency (RF) antenna 410, a receiver 420, a transmitter 430, a baseband processing module 440, a memory 450, a processor 460, a local oscillator generator (LOGEN) 470, and a power supply 480. In various embodiments of the subject technology, one or more of the blocks represented in FIG. 4 may be integrated on one or more semiconductor substrates. For example, the blocks 420-470 may be realized in a single chip or a single system on chip, or may be realized in a multi-chip chipset.

The RF antenna 410 may be suitable for transmitting and/or receiving RF signals (e.g., wireless signals) over a wide range of frequencies. Although a single RF antenna 410 is illustrated, the subject technology is not so limited.

The receiver 420 may comprise suitable logic circuitry and/or code that may be operable to receive and process signals from the RF antenna 410. The receiver 420 may, for example, be operable to amplify and/or down-covert received wireless signals. In various embodiments of the subject technology, the receiver 420 may be operable to cancel noise in received signals and may be linear over a wide range of frequencies. In this manner, the receiver 420 may be suitable for receiving signals in accordance with a variety of wireless standards. Wi-Fi, WiMAX, Bluetooth, and various cellular standards. In various embodiments of the subject technology, the receiver 420 may not require any SAW filters and few or no off-chip discrete components such as large capacitors and inductors.

The transmitter 430 may comprise suitable logic circuitry and/or code that may be operable to process and transmit signals from the RF antenna 410. The transmitter 430 may, for example, be operable to up-covert baseband signals to RF signals and amplify RF signals. In various embodiments of the subject technology, the transmitter 430 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 430 may be operable to provide signals for further amplification by one or more power amplifiers.

The duplexer 412 may provide isolation in the transmit band to avoid saturation of the receiver 420 or damaging parts of the receiver 420, and to relax one or more design requirements of the receiver 420. Furthermore, the duplexer 412 may attenuate the noise in the receive band. The duplexer may be operable in multiple frequency bands of various wireless standards.

The baseband processing module 440 may comprise suitable logic, circuitry, interfaces, and/or code that may be operable to perform processing of baseband signals. The baseband processing module 440 may, for example, analyze received signals and generate control and/or feedback signals for configuring various components of the wireless communication device 400 such as the receiver 420. The baseband processing module 440 may be operable to encode, decode, transcode, modulate, demodulate, encrypt, decrypt, scramble, descramble, and/or otherwise process data in accordance with one or more wireless standards.

The processor 460 may comprise suitable logic, circuitry, and/or code that may enable processing data and/or controlling operations of the wireless communication device 400. In this regard, the processor 460 may be enabled to provide control signals to various other portions of the wireless communication device 400. The processor 460 may also control transfers of data between various portions of the wireless communication device 400. Additionally, the processor 460 may enable implementation of an operating system or otherwise execute code to manage operations of the wireless communication device 400.

The memory 450 may comprise suitable logic, circuitry, and/or code that may enable storage of various types of information such as received data, generated data, code, and/or configuration information. The memory 450 may comprise, for example, RAM, ROM, flash, and/or magnetic storage. In various embodiment of the subject technology, Information stored in the memory 450 may be utilized for configuring the receiver 420 and/or the baseband processing module 440.

The local oscillator generator (LOG EN) 470 may comprise suitable logic, circuitry, interfaces, and/or code that may be operable to generate one or more oscillating signals of one or more frequencies. The LOGEN 470 may be operable to generate digital and/or analog signals. In this manner, the LOGEN 470 may be operable to generate one or more clock signals and/or sinusoidal signals. Characteristics of the oscillating signals such as the frequency and duty cycle may be determined based on one or more control signals from, for example, the processor 460 and/or the baseband processing module 440.

In operation, the processor 460 may configure the various components of the wireless communication device 400 based on a wireless standard according to which it is desired to receive signals. Wireless signals may be received via the RF antenna 410 and amplified and down-converted by the receiver 420. The baseband processing module 440 may perforin noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 450, and/or information affecting and/or enabling operation of the wireless communication device 400. The baseband processing module 440 may modulate, encode and perform other processing on audio, video, and/or control signals to be transmitted by the transmitter 430 in accordance to various wireless standards. The power supply 480 may provide one or more regulated rail voltages (e.g., $V_{DD}$) for various circuitries of the wireless communication device 400. In one or more implementations of the subject technology, the power supply 480 may include a charge pump LDO regulator with in-rush current control, similar to the charge pump LDO regulator 100B of FIG. 1B, as described above.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to an configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A circuit for a charge-pump low-dropout (LDO) regulator, the circuit comprising:
   a comparator circuit configured to control a pass transistor based on an error signal;
   a pre-charge path provided between a supply voltage and an output node of the regulator, the pre-charge path being configured to allow charging of an output capacitor to a pre-charge voltage during a pre-charge operation mode, the output capacitor being coupled between the output node of the regulator and ground potential, wherein the pre-charge path comprises at least one pre-charge switch configured to be in a conducting state during the pre-charge mode of operation;
   the pass transistor configured to allow charging of the output capacitor during an LDO mode of operation; and
   a charge-pump circuit configured to provide a current for charging the output capacitor during the LDO mode of operation.

2. The circuit of claim 1, wherein:
   the error signal includes a difference between an output voltage of the regulator and a reference signal, and
   the at least one pre-charge switch includes an MOS or a BJT transistor.

3. The circuit of claim 2, wherein:
   the at least one pre-charge switch is a small switch, and
   one of the at least one pre-charge switch is coupled in parallel to the pass transistor and is configured to be in a conducting state during the pre-charge mode of operation.

4. The circuit of claim 1, wherein:
   the reference voltage is a desired output voltage of the regulator,
   the pre-charge voltage is a fraction of the reference voltage, and
   the fraction is approximately 80%.

5. The circuit of claim 1, further comprising a feedback switch coupled between an output of the comparator and a control terminal of the pass transistor, wherein the feedback switch is configured to be in a non-conducting state during the pre-charge mode of operation, and wherein the control terminal of the pass transistor includes a gate terminal of an MOS transistor or a base terminal of a BJT.

6. The circuit of claim 1, wherein the pre-charge path is configured to drastically reduce an in-rush current passing through the pass transistor during the LDO mode of operation by pre-charging the output capacitor, during the pre-charge mode of operation.

7. The circuit of claim 1, wherein:
   the pass transistor is configured to allow charging of the output capacitor from the pre-charge voltage to the reference voltage, during the LDO mode of operation,
   during the LDO mode of operation, the feedback switch is configured in a conducting state to allow the comparator to keep the pass transistor in an active state, and
   during the LDO mode of operation, the output voltage of the regulator rises to approximately the same voltage as the reference voltage.

8. The circuit of claim 6, wherein the charge-pump circuit comprises a fly-back capacitor and a plurality of switches, and the charge-pump circuit is further configured to provide a charging current for the output capacitor during a charge-pump mode of operation.

9. A method for providing a charge-pump low-dropout (LDO) regulator, the method comprising:
   configuring a comparator circuit to control a pass transistor based on an error signal;
   providing a pre-charge path between a supply voltage and an output node of the regulator, and configuring the pre-charge path to allow charging of an output capacitor to a pre-charge voltage during a pre-charge operation mode, the output capacitor being coupled between the output node of the regulator and ground potential;
   configuring the pass transistor to allow charging of the output capacitor during an LDO mode of operation; and
   configuring a charge-pump circuit to provide a current for charging the output capacitor during the LDO mode of operation,.
   wherein providing the pre-charge path comprises providing at least one pre-charge switch configured to be in a conducting state during the pre-charge mode of operation.

10. The method of claim 9, wherein:
    the error signal includes a difference between an output voltage of the regulator and a reference signal, and
    the at least one pre-charge switch includes an MOS or a BJT transistor.

11. The method of claim 10, wherein the at least one pre-charge switch is a small switch, and
    the method further comprises:
    coupling one of the at least one pre-charge switch in parallel to the pass transistor; and
    configuring the one of the at least one pre-charge switch to be in a conducting state during the pre-charge mode of operation.

12. The method of claim 9, wherein:
    the reference voltage is a desired output voltage of the regulator,
    the pre-charge voltage is a fraction of the reference voltage, and
    the fraction is approximately 80%.

13. The method of claim 9, further comprising coupling a feedback switch between an output of the comparator and a control terminal of the pass transistor, and configuring the feedback switch to be in a non-conducting state during the pre-charge mode of operation, and wherein the control terminal of the pass transistor includes a gate terminal of a MOS transistor or a base terminal of a BJT.

14. The method of claim 9, further comprising pre-charging the output capacitor, during the pre-charge mode of operation, to drastically reduce an in-rush current passing through the pass transistor during the LDO mode of operation.

15. The method of claim 9, further comprising:
    configuring the pass transistor to allow charging of the output capacitor from the pre-charge voltage to the reference voltage, during the LDO mode of operation,
    configuring the feedback switch, during the LDO mode of operation, in a conducting state and allowing the comparator to keep the pass transistor in an active state, and allowing, during the LDO mode of operation, the output voltage of the regulator to rise to approximately the same voltage as the reference voltage.

16. The method of claim 14, wherein the charge-pump circuit comprises a fly-back capacitor and a plurality of switches, and the method further comprises configuring the charge-pump circuit to provide a charging current for the output capacitor during a charge-pump mode of operation.

17. A power-supply circuit, comprising:
a power source to provide a supply voltage; and
a charge-pump low-dropout (LDO) regulator circuit comprising:
  a comparator circuit configured to control a pass transistor based on an error signal;
  a pre-charge path provided between a supply voltage and an output node of the regulator, the pre-charge path being configured to allow charging of an output capacitor to a pre-charge voltage during a pre-charge operation mode, the output capacitor being coupled between the output node of the regulator and ground potential, wherein the pre-charge path comprises at least one pre-charge switch configured to be in a conducting state during the pre-charge mode of operation;
  the pass transistor configured to allow charging of the output capacitor during an LDO mode of operation; and
  a charge-pump circuit configured to provide a current for charging the output capacitor during the LDO mode of operation.

18. The power-supply circuit of claim 17, wherein:
the error signal includes a difference between an output voltage of the regulator and a reference signal, and
the at least one pre-charge switch includes an MOS or a BJT transistor.

the at least one pre-charge switch is a small switch, and
one of the at least one pre-charge switch is coupled in parallel to the pass transistor and is configured to be in a conducting state during the pre-charge mode of operation.

19. The power-supply circuit of claim 17, further comprising a feedback switch coupled between an output of the comparator and a control terminal of the pass transistor, wherein:
the feedback switch is configured to be in a non-conducting state during the pre-charge mode of operation,
the control terminal of the pass transistor includes a gate terminal of a MOS transistor or a base terminal of a BJT, and
pre-charging the output capacitor, during the pre-charge mode of operation, drastically reduces an in-rush current passing through the pass transistor during the LDO mode of operation.

20. The power-supply circuit of claim 19, wherein:
the pass transistor is configured to allow charging of the output capacitor from the pre-charge voltage to the reference voltage, during the LDO mode of operation,
during the LDO mode of operation, the feedback switch is configured in a conducting state to allow the comparator to keep the pass transistor in an active state,
during the LDO mode of operation, the output voltage of the regulator is at approximately the same voltage as the reference voltage,
the charge-pump circuit comprises a fly-back capacitor and a plurality of switches, and
the charge-pump circuit is further configured to provide a charging current for the output capacitor during a charge-pump mode of operation.

* * * * *